United States Patent
Brewington

(10) Patent No.: US 6,837,191 B2
(45) Date of Patent: Jan. 4, 2005

(54) PET DIAPER GARMENT

(76) Inventor: Dana Brewington, 2332 Ashboro Dr., Chevy Chase, MD (US) 20815

(*) Notice: Subject to any disclaimer, the term of this patent is extended or adjusted under 35 U.S.C. 154(b) by 0 days.

(21) Appl. No.: 10/798,925

(22) Filed: Mar. 11, 2004

(65) Prior Publication Data

US 2004/0244727 A1 Dec. 9, 2004

Related U.S. Application Data

(60) Continuation-in-part of application No. 10/702,627, filed on Nov. 6, 2003, which is a division of application No. 10/428,589, filed on May 2, 2003, now Pat. No. 6,675,745.

(51) Int. Cl.$^7$ ............................................... A01K 23/00
(52) U.S. Cl. ....................................... 119/869; 119/850
(58) Field of Search .................. 119/850, 869, 119/868, 856; 604/385.09, 385.19, 385.11, 393; 54/79.1, 79.2, 79.4; D30/144, 145

(56) References Cited

U.S. PATENT DOCUMENTS

| | | | | |
|---|---|---|---|---|
| 3,792,687 A | * | 2/1974 | Ehrman ....................... 119/868 |
| 4,290,386 A | * | 9/1981 | Eiriksson ..................... 119/868 |
| 4,527,991 A | * | 7/1985 | Msarsa ........................ 604/399 |
| 4,577,591 A | * | 3/1986 | Wesseldine .................. 604/391 |
| 4,813,949 A | * | 3/1989 | O'Rourke .................... 604/391 |
| 4,996,949 A | * | 3/1991 | Wunderman et al. ....... 604/390 |
| 5,146,874 A | * | 9/1992 | Vidal ........................... 119/868 |
| D334,252 S | * | 3/1993 | Stubbs ........................ D30/144 |
| 5,226,386 A | * | 7/1993 | Thoma ........................ 119/869 |
| 5,234,421 A | * | 8/1993 | Lowman ................ 604/385.09 |
| 5,555,847 A | * | 9/1996 | Kelly ........................... 119/850 |
| 5,662,640 A | * | 9/1997 | Daniels ....................... 604/392 |
| 5,787,843 A | * | 8/1998 | Chao ........................... 119/869 |
| 5,954,015 A | * | 9/1999 | Ohta ........................... 119/850 |
| 6,142,105 A | * | 11/2000 | McKnight ................... 119/850 |
| 6,368,313 B1 | * | 4/2002 | Howard ................ 604/385.09 |
| 6,557,497 B1 | * | 5/2003 | Milligan ..................... 119/850 |

FOREIGN PATENT DOCUMENTS

JP        2002238394    *   8/2002

* cited by examiner

Primary Examiner—Michael J. Carone
Assistant Examiner—T. Nguyen
(74) Attorney, Agent, or Firm—Fitch, Even, Tabin & Flannery

(57) ABSTRACT

The present invention is directed to a pet diaper garment that includes an absorbent garment portion and a bib strap. The absorbent garment and bib strap may be customized to securely and comfortably fit an animal.

12 Claims, 11 Drawing Sheets

PET DIAPER GARMENT

The present application is a continuation-in-part application of U.S. patent application Ser. No. 10/702,627, filed Nov. 6, 2003, which is a divisional application of U.S. patent application Ser. No. 10/428,589, filed May 2, 2003, now U.S. Pat. No. 6,675,745.

The present invention relates to a pet diaper garment. More particularly, the pet diaper garment includes a customizable tail opening and customizable bib strap that are effective for allowing the garment to be easily customized to securely and comfortably fit an animal.

BACKGROUND

As a result of advanced age or medical condition, pets, such as dogs and cats, may exhibit a permanent or temporary inability to control their waste discharges, particularly urinary discharges, leading to numerous and problematic "accidents" in the home, automobile, etc. The same situation can arise, whether in animal hospitals or later in the home, following particular forms of surgery performed on the pets. Accidents of this nature also are common in very young animals, particularly dogs, during their training period. Apart from such situations, there often exists other instances where a means for preventing accidents of this nature is desirable, such as for dogs left unattended for extended periods in the home, or dogs owned by persons residing in apartments who cannot immediately access outdoor areas, or the like.

A number of pet diapers are available. However, these diapers tend to be very ineffective as they do not securely fit the animal. For example, when a pet diaper is applied to an animal having a small tail, the clearance between the tail and the tail hole tends to be too large. The clearance may allow solid and fluid waste to escape.

Often times a pet diaper forms gaps or even falls off the animal. Some diapers are secured to the animal with suspenders or belts. The suspenders may be uncomfortable or may not provide the desired secure fit because they do not always match the shape of the animal.

SUMMARY

The present invention is directed to a pet diaper garment for use with four legged domestic animals such as dogs or cats, or two legged animals, having incontinency problems due to age or illness. The diaper garment may also be used to prevent accidents which may occur when the animal is left alone for extended periods of time or when the animal is still being trained and for female dogs in heat. The pet diaper garment is also effective for use as a physical barrier for avoiding pregnancy. The garment is especially effective as it may be easily customized by the user to securely and comfortably fit onto the animal.

The pet diaper includes an absorbent garment portion that encircles the animals torso, and a bib strap that helps to secure the absorbent garment to the animal. The absorbent garment portion includes a back section having an absorbent pad covering a rear section of the animal, a front section having an absorbent pad covering an abdominal area of the animal, and stretchable side sections connecting the back and front sections to form a top section. The absorbent garment portion may also include an elastic waist band effective for securing the absorbent garment portion to the animal.

The back section of the absorbent garment portion includes perforations that are effective for allowing a user to easily locate and create a customized tail opening at the base of the animal's tail. The customized tail opening accommodates the animal's tail, affords greater comfort to the animal, and reduces the risk that waste material will escape.

In one aspect of the invention, the absorbent garment portion may be formed as a single piece. In this aspect, the absorbent garment portion may be put onto the animal by inserting the animal's legs into leg openings and then pulling the absorbent garment around the animal's torso. An opening may be formed in the back section of the absorbent garment by opening perforations in the back section which match the position of the animals tail.

In another aspect of the invention, the absorbent garment portion may open along its top section where the stretchable side sections are joined. In this aspect, the absorbent garment portion may be put onto the animal by inserting the animal's legs into leg openings and then pulling the absorbent garment around the animal's torso and securing the side sections together to form a top section. The opening along the top section may be extended by opening perforations in the back section further such that the back and side sections can be closed to securely encircle the animals tail.

The pet diaper garment also includes a bib strap that helps to secure the absorbent garment to the animal. The bib strap includes a single strap section that is attached to the front section of the absorbent garment. The bib strap includes perforations that allow the strap to be separated into two sections. The two separated sections may extend around the animals neck and front section and connect with the back section of the absorbent garment. In alternative aspects of the invention, the bib strap may separate to encircle the animal's neck area and then connect to the back section of the absorbent garment in two areas, or the bid strap may rejoin after encircling the animal's neck area and then connect to the back section of the absorbent garment. The bib strap may be formed out of elastic material to further help secure the absorbent garment portion securely to the animal.

The present invention also provides a method for containing waste discharges from pets. In accordance with the method, the absorbent garment of the invention is encircled around an animal's torso. A tail opening is located and created through perforations in the back section of the absorbent garment and the back section is positioned around the animal's tail. The absorbent garment is further secured to the animal with the bib strap. The bib strap may be separated into two sections and extended around the neck and front of the animal. The bib strap is then connected to the top section of the absorbent garment.

DETAILED DESCRIPTION

The present invention provides a diaper garment for household pets that securely fits the pet body without causing discomfort to the pet and without being perceived by the pet as an annoyance. The secure fit is aided through the combination of the customizable tail opening in the absorbent garment and the customizable bib strap.

Absorbent Garment

Figure 1:
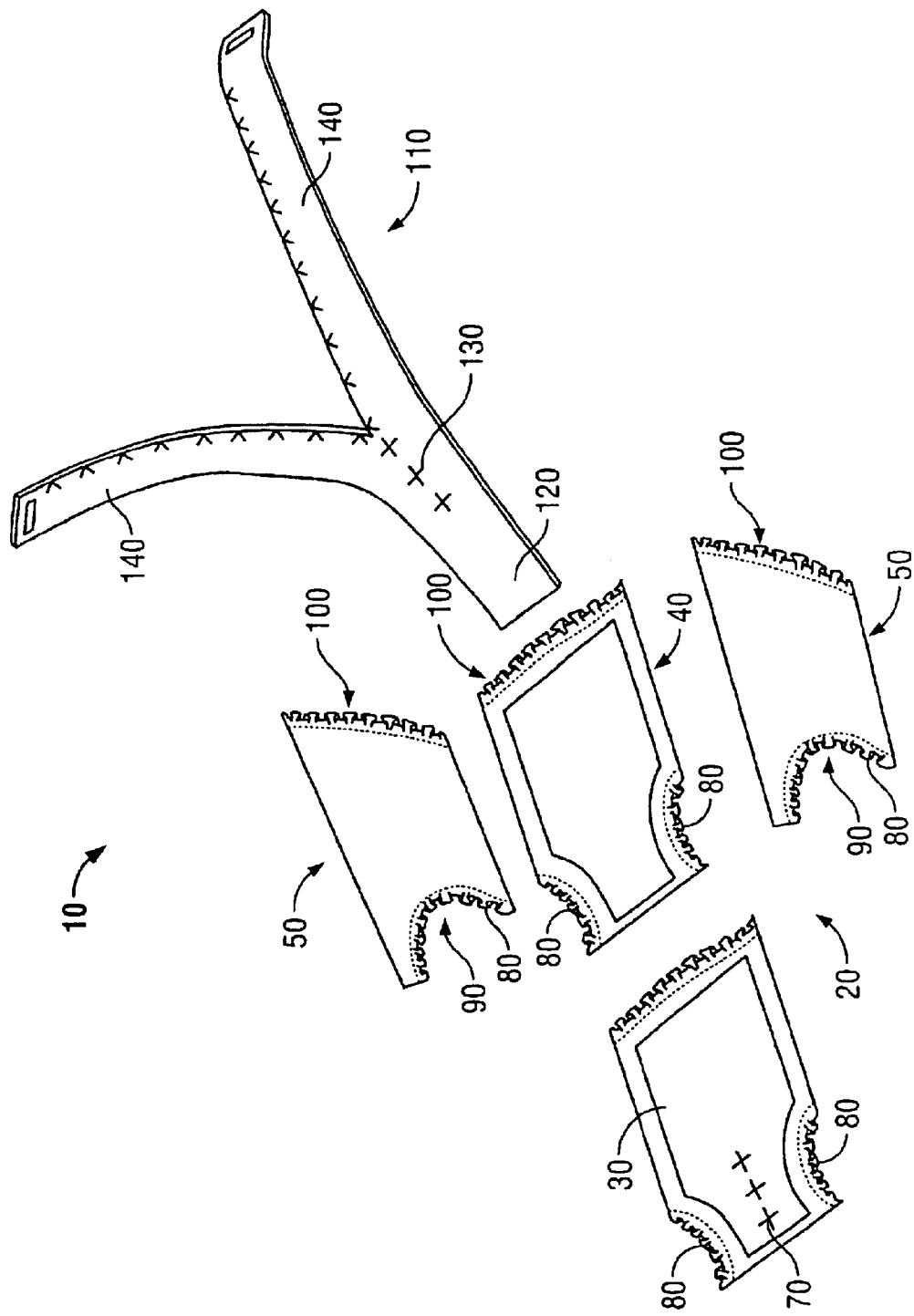
FIG. 1 shows component parts of the pet garment.
Figure 2:
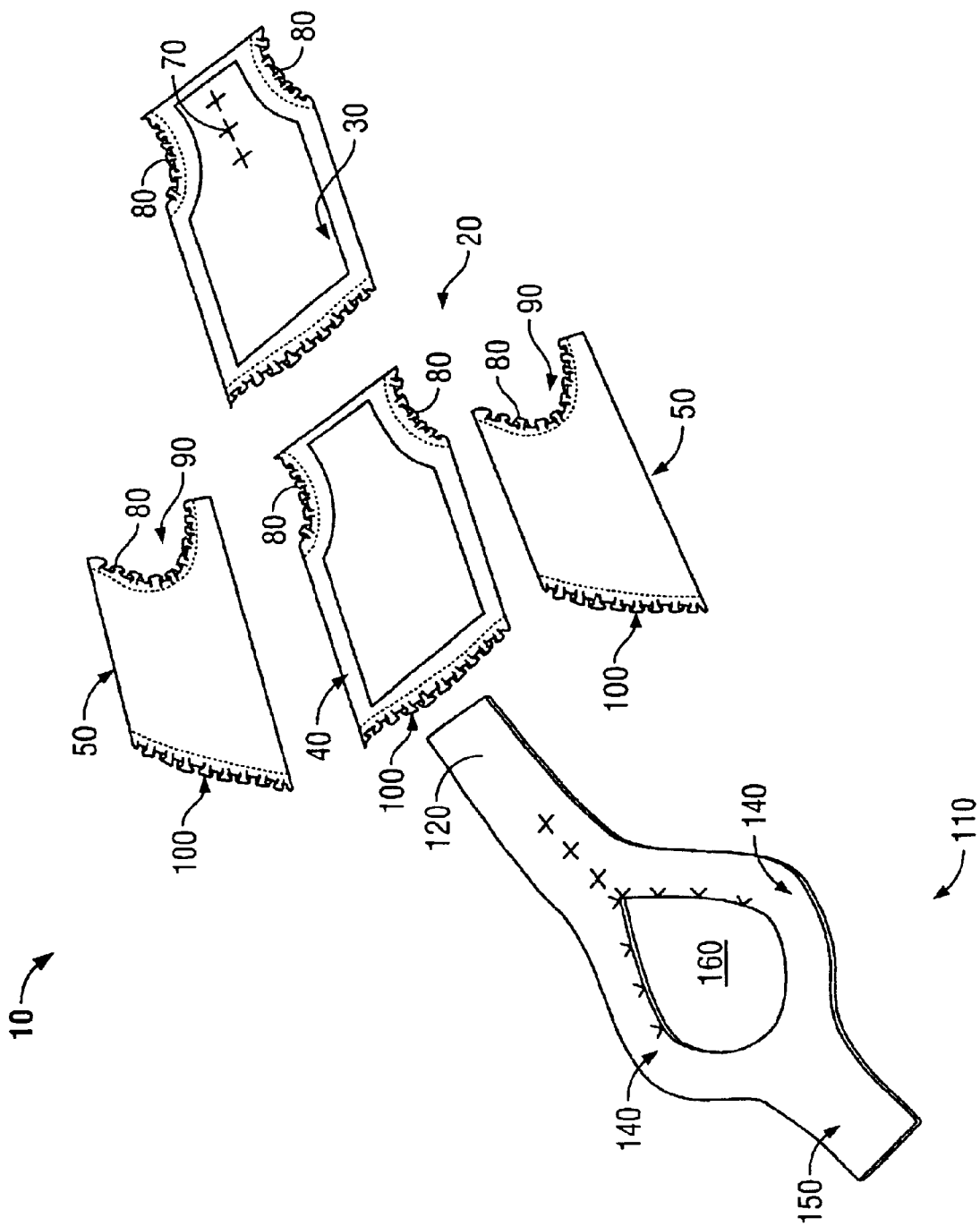
FIG. 2 shows component parts of the pet garment.
Figure 3:
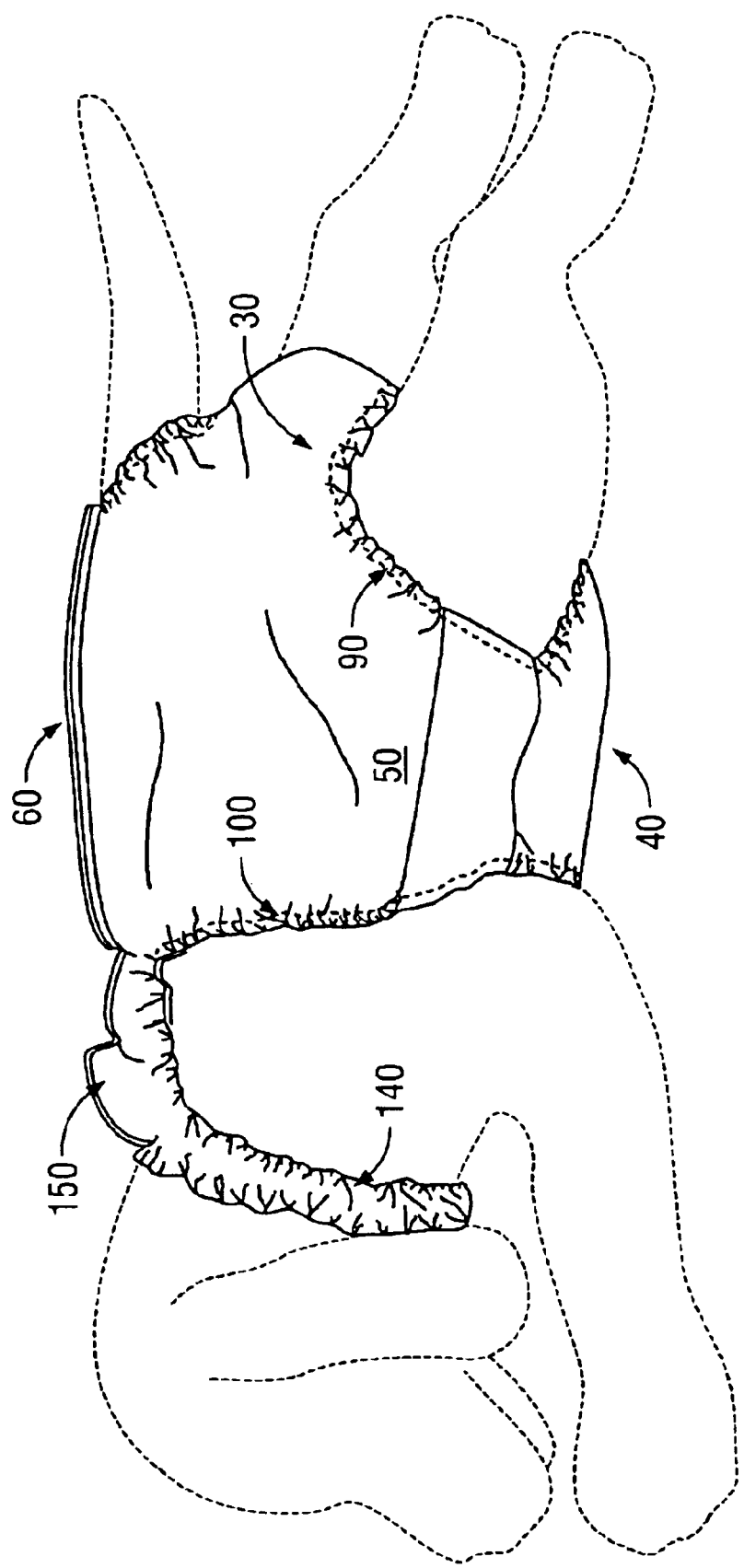
FIG. 3 is a side view of a dog wearing the pet garment.
Figure 8:
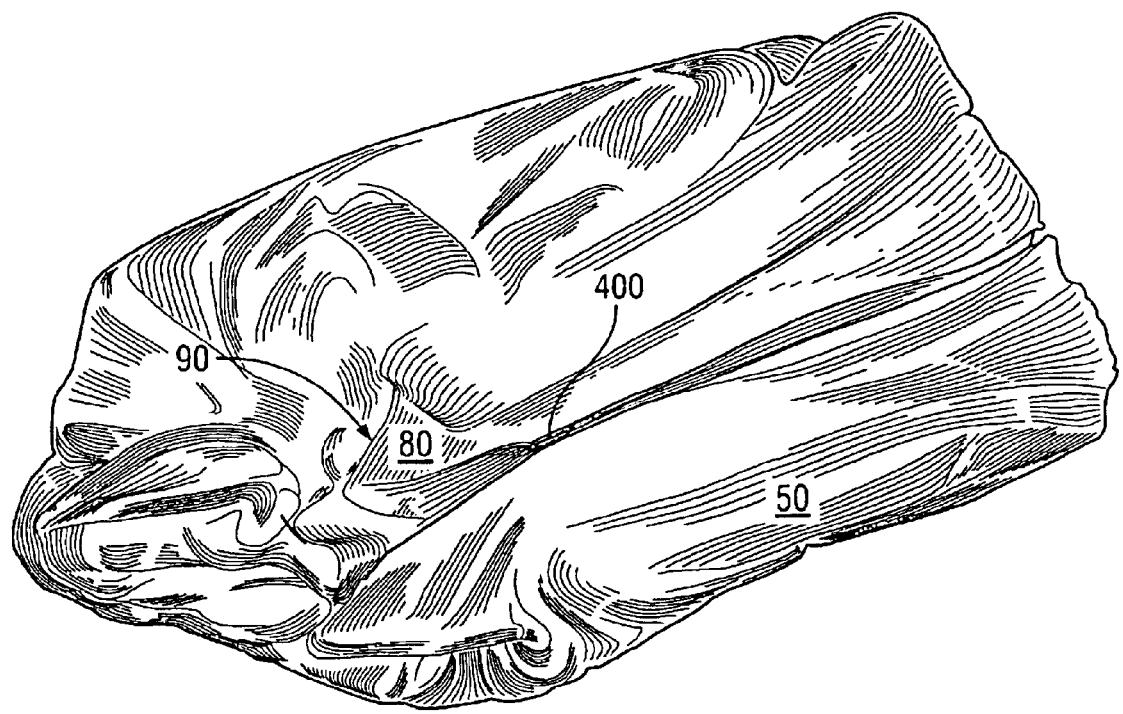
FIG. 8 is a side view of the absorbent garment with a closed snap closure.
Figure 9:
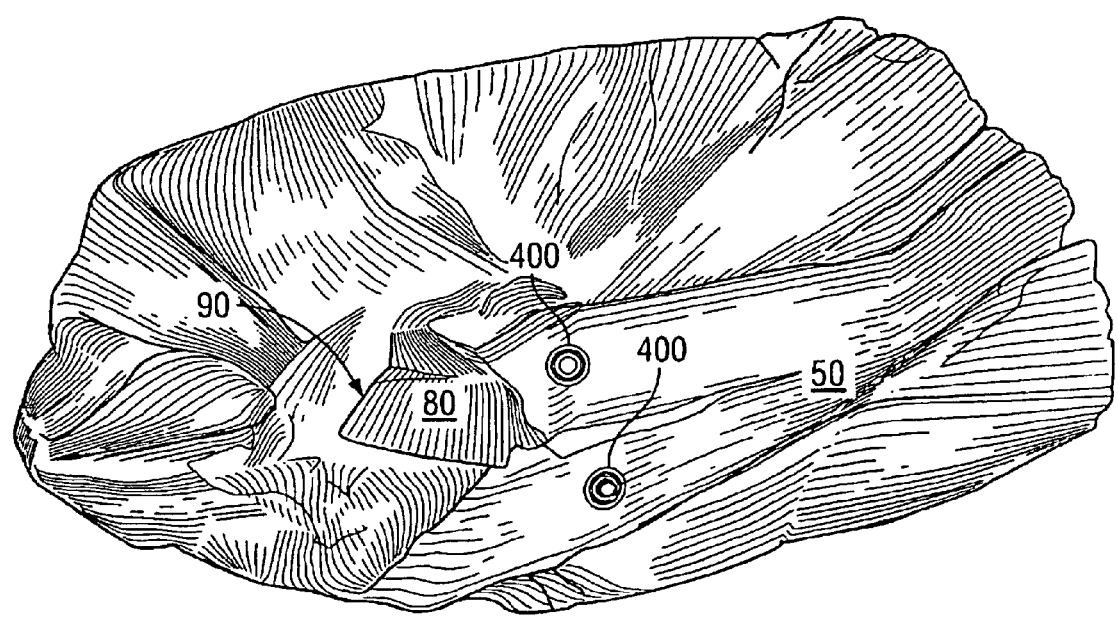
FIG. 9 is a side view of the absorbent garment with an open snap closure.

As shown in FIGS. 1 and 2, the pet diaper garment 10 of the present invention includes an absorbent garment 20. The absorbent garment 20 includes a back section 30, a front section 40, and stretchable side sections 50 which join to form a top section 60 (shown in FIG. 3). The back section 30 may include back section perforations 70. The absorbent garment 20 also includes leg openings 80 that may be defined at least in part by circumferentially disposed elastic material 90. The absorbent garment 20 may be further secured around the animals legs with a snap closure 400 (shown in FIGS. 8 and 9).

The absorbent garment 20 may also include an elastic waist band 100. In an important aspect, the absorbent garment 20 does not include a belt, As used herein, "no belt" means that the absorbent garment 20 does not include a waist band, elastic or otherwise, that is removable from the absorbent garment 20.

The back 30 and front section 40 may be formed from an integral unitary material, or may be formed by attachment together of separate back 30 and front 40 sections which can be made of the same or different materials. The absorbent garment 20 includes stretchable side sections 50 adapted to engage the flank areas of the animal. The side sections 50 can be separate components one from the other, and which are attached to respective edge areas of the back 30 and front 40 sections. The side sections 50 may be made of the same or different material used in making the back 30 and front sections 40. The side sections 50 are made of material having elasticity so as to permit a snug fit along the flanks of the animal while at the same time permitting appropriate expansion so as to not interfere with breathing or other normal body movements.

Figure 6:
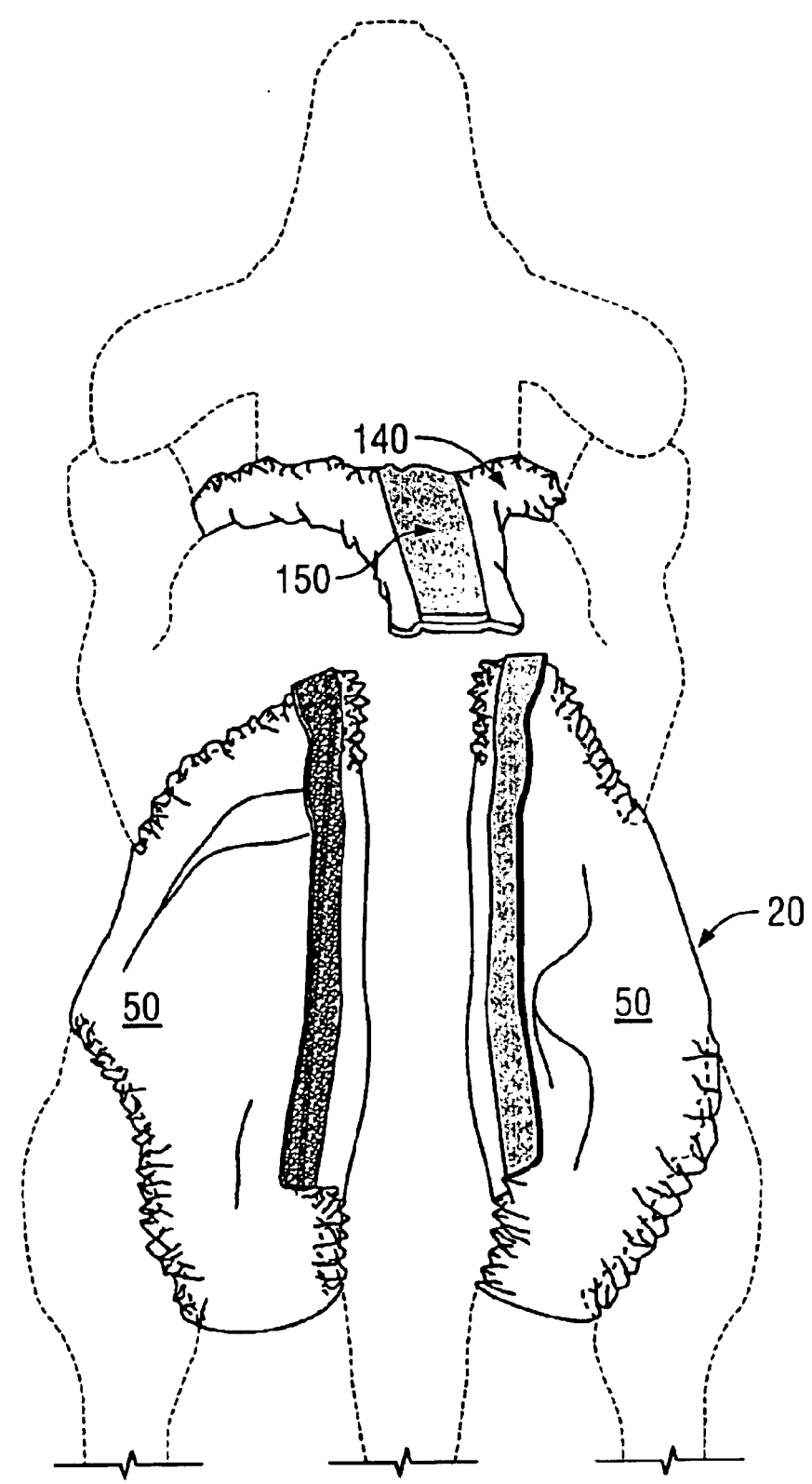
FIG. 6 is a top view of a dog wearing the pet garment.
Figure 10:
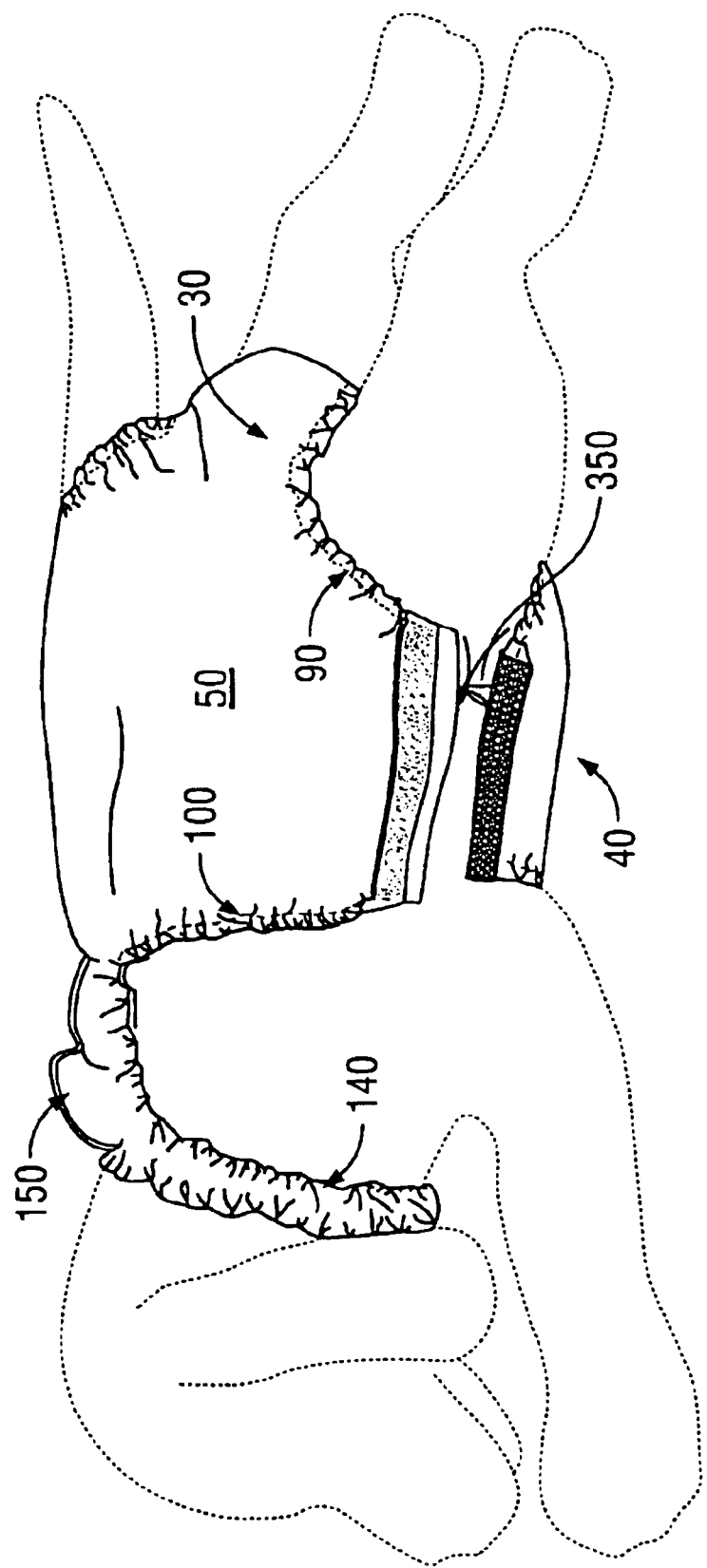
FIG. 10 is a side view of a dog wearing the pet garment with a side opening.

As shown in FIG. 6, the absorbent garment 20 may open along the back section. Side section 50 may be joined by connection, such as Velcro, to secure the absorbent garment to the animal and to provide a secured customized fit around the animal's tail. Alternatively, the absorbent garment 20 may open along a side section 50 at side opening 350 (shown in FIG. 10). Side opening 350 may be closed using connectors such as Velcro.

The absorbent garment 20 includes an absorbent material positioned on its inner face which is effective for absorbing liquid waste from the animal or for containing solid waste. The absorbent garment 20 may include an inner permeable sheet made of non woven fabric, an outer waterproof sheet made of synthetic resin and absorbent material located between the inner and outer sheets.

In one aspect of the invention, the absorbent garment 20 is completely detachable from the bib strap 110. Alternatively, the absorbent garment 20 may be permanently attached to the bib strap 110. In this aspect, the absorbent garment 20 may include removable absorbent pads.

Bib Strap

Figure 4:
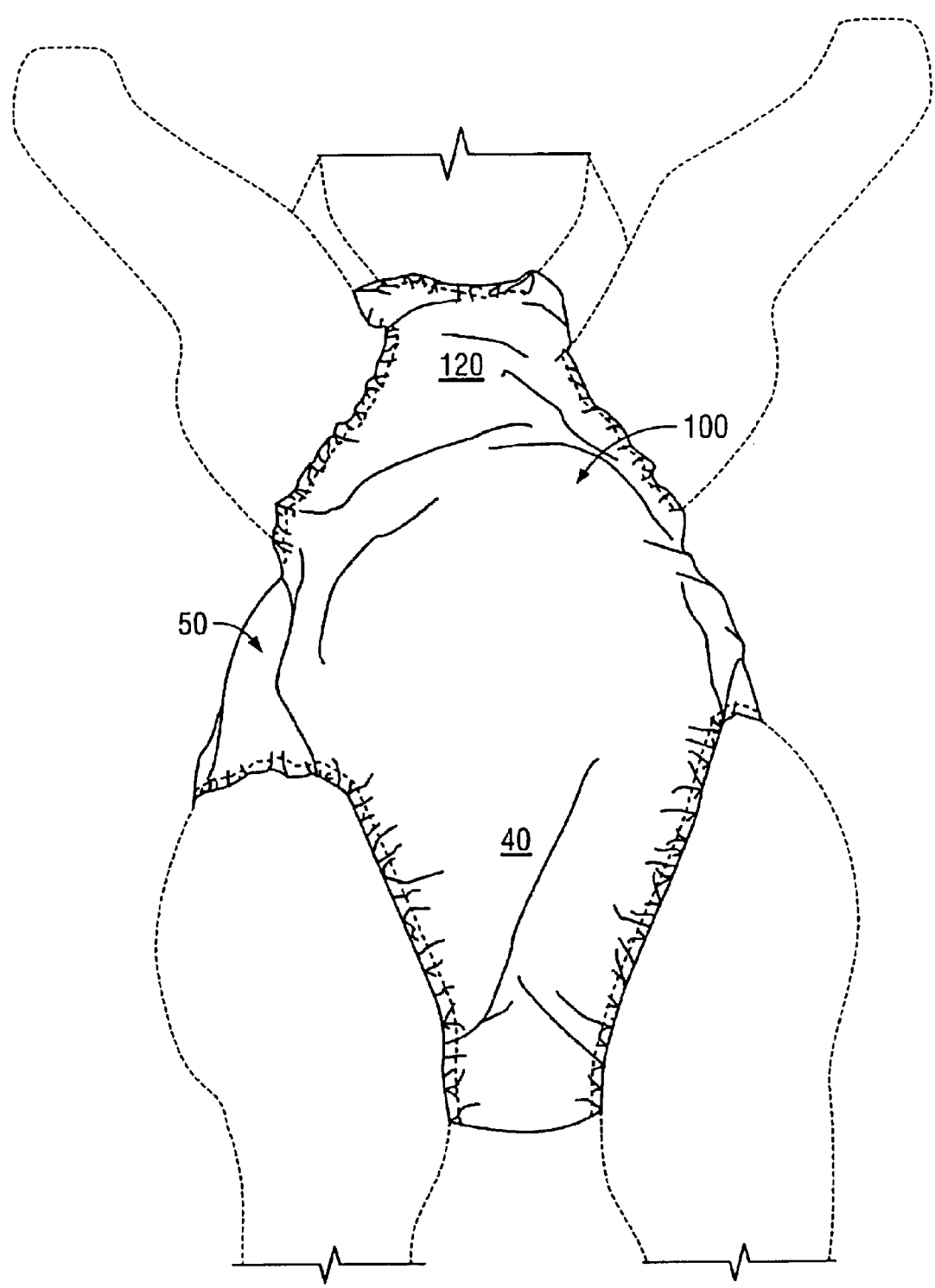
FIG. 4 is a bottom view of a dog wearing the pet garment.
Figure 5:
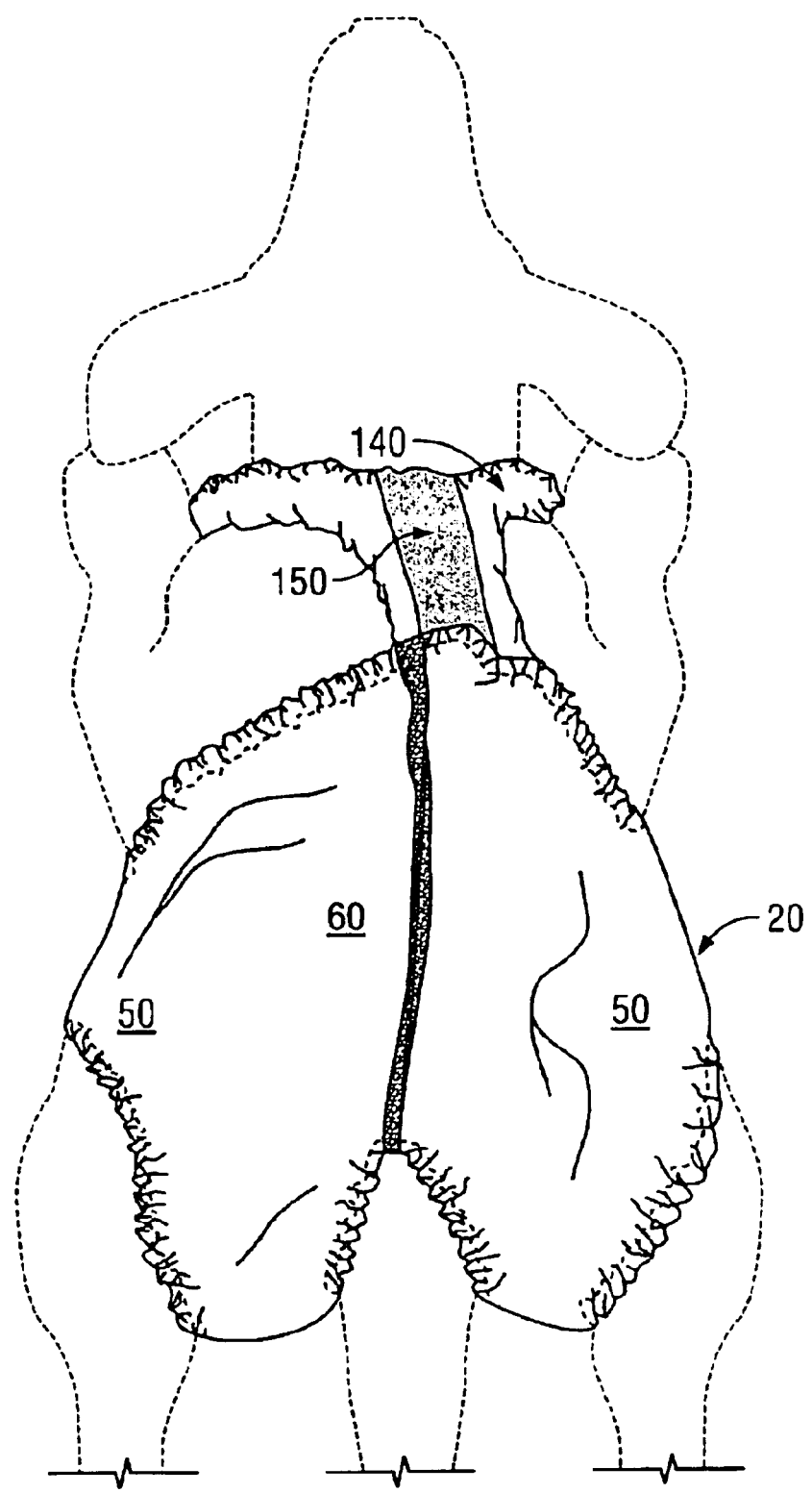
FIG. 5 is a top view of a dog wearing the pet garment.

As shown in FIGS. 1 and 2, the pet diaper garment 10 of the present invention includes a bib strap 110. The bib strap 110 includes a first single strap section 120 that is connected to the front section 40. In one embodiment, the first single strap section 120 may connect to the entire width of the front section 40 (FIG. 4). In an alternative aspect, a smaller portion of strap section 120 may be attached to a portion of the front section 40 which is less than the entire width of the front section. The single strap section 120 may be permentantly attached to the front section 40 such as, for example, with stitching. Alternatively, the single strap similarly may be removably attached to the front section 120, such as, for example, with Velcro. The first single strap section 120 includes strap perforations 130. The perforations 130 allow the single strap section 120 to be separated into separate strap sections 140 or shoulder straps. In an alternative aspect of the invention shown in FIG. 2, the separate strap sections 140 or shoulder straps may rejoin to form a second single strap section 150 and define head opening 160. As shown in FIG. 5, the single strap section 150 may be rejoined with the absorbent garment 20, with a connector, for example, Velcro.

Figure 7:
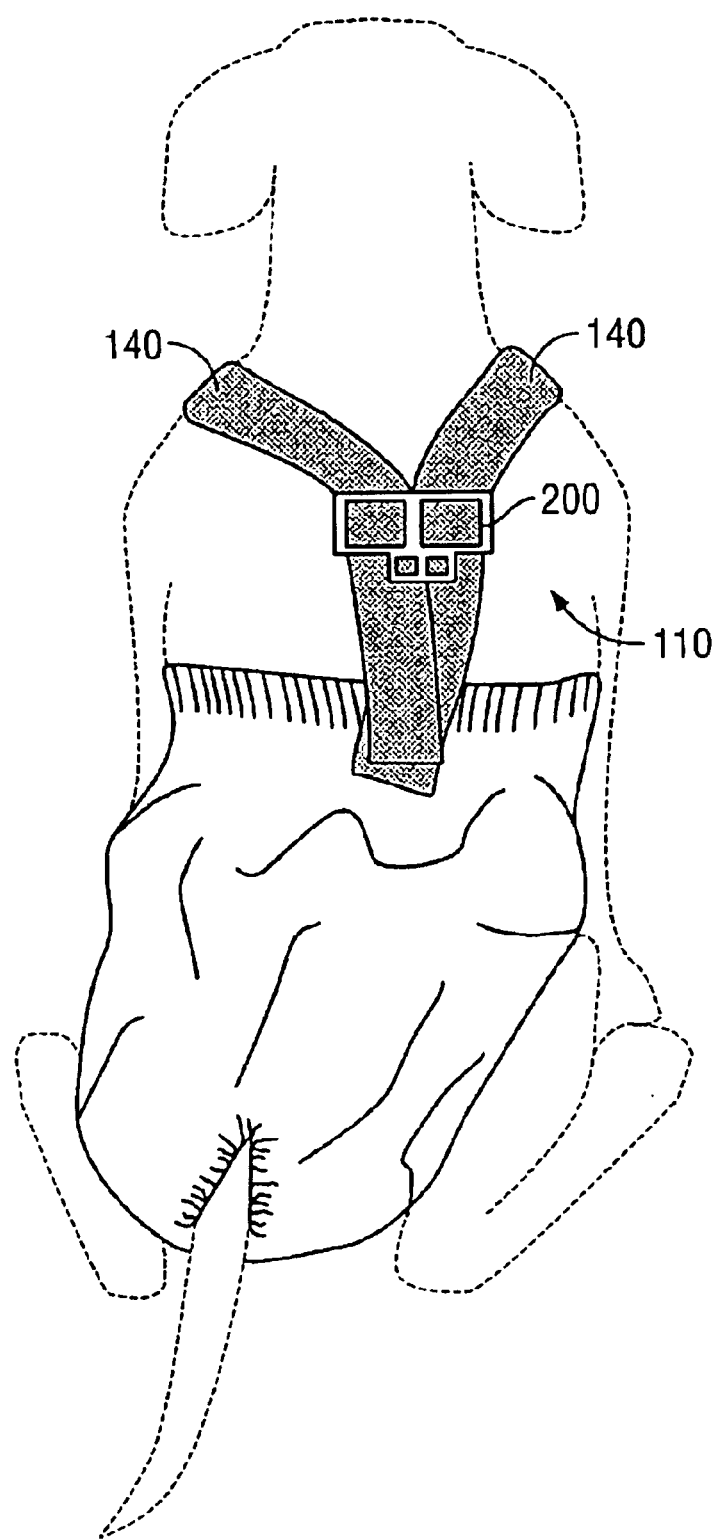
FIG. 7 is a back view of a dog wearing the pet garment.

As shown in FIG. 7, the shoulder straps 140 of the bib strap 110 may rejoin at a connector 200 and extend to connect to the absorbent garment 20. The connector 200 may be any type of connector known in the art.

Figure 11:
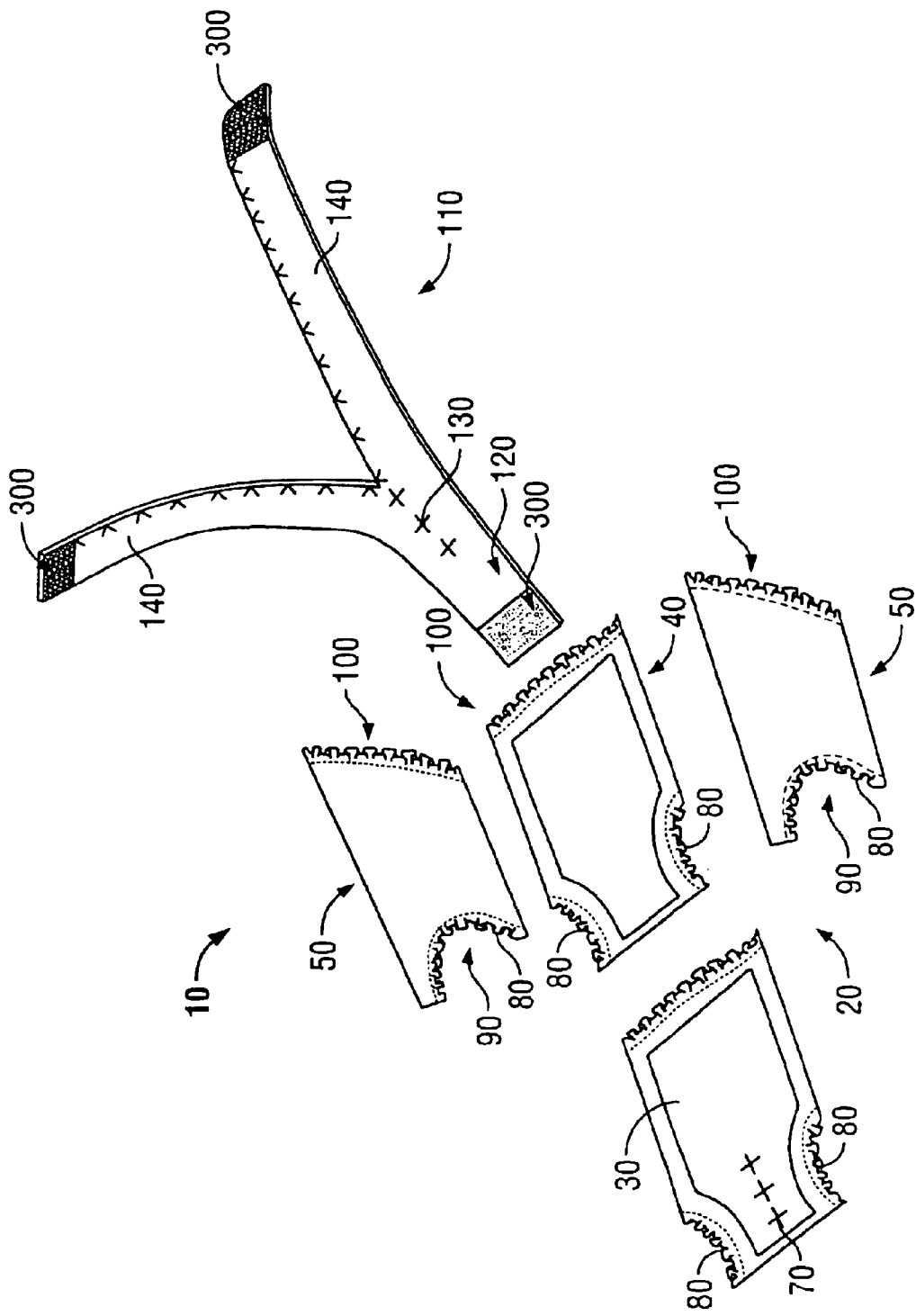
FIG. 11 shows component parts of the pet garment.
Figure 12:
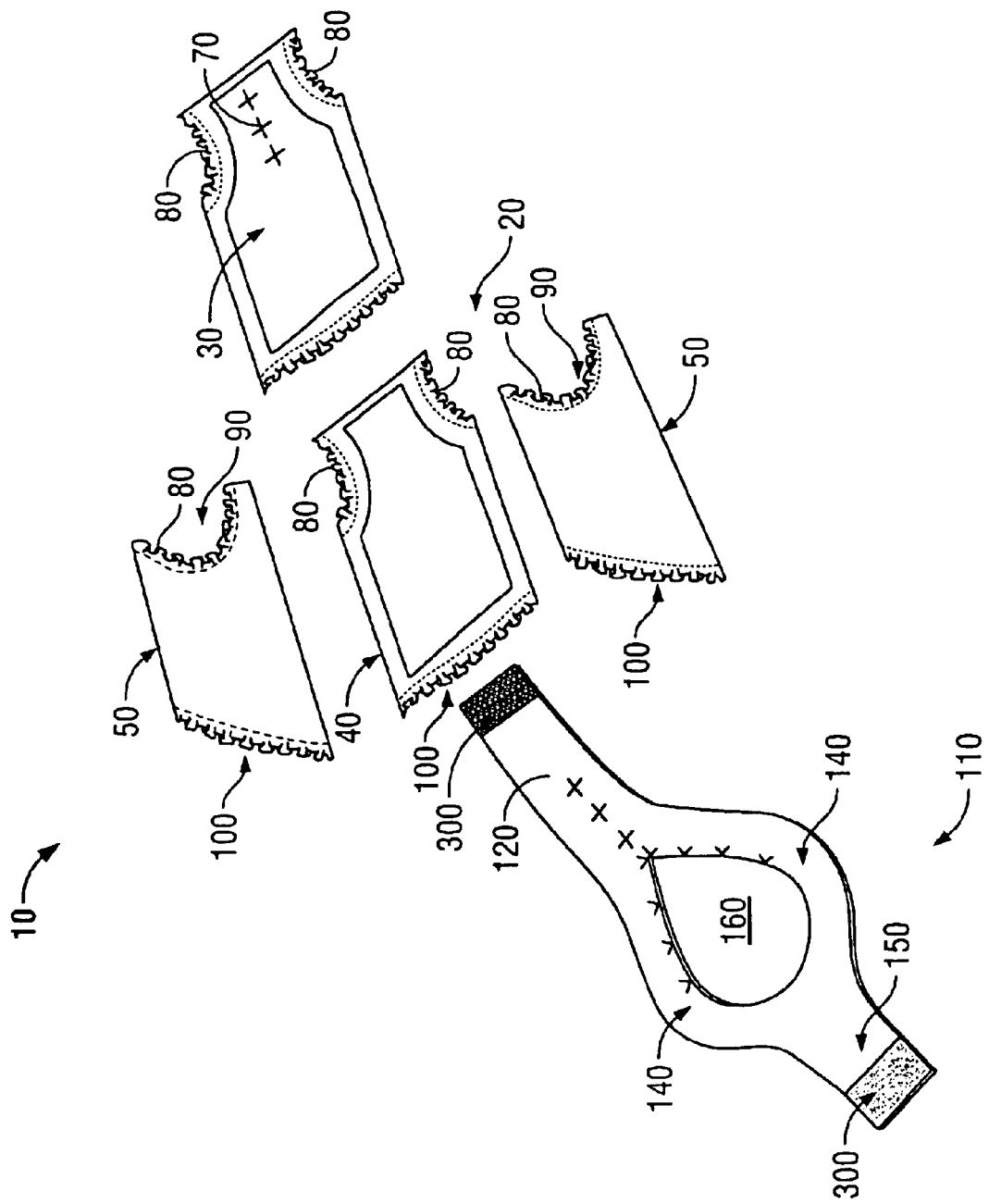
FIG. 12 shows component parts of the pet garment.

In an alternative aspect shown in FIG. 11, the bib strap 110 may be reversibly attached or connected to the absorbent garment 20. The bib strap 110 may be reversibly connected through a reversible connector 300. One of example of a reversible connector 300 is a Velcro type connector which allows the bib strap 110 to be connected, adjusted, and subsequently removed from the absorbent garment 20. The type of bib strap 110 utilized may be the type shown in FIG. 11 and could also be the type of bib strap 110 shown in FIG. 12. The bib strap shown in FIG. 12 includes a head opening 160 and the reversible connectors 300.

Fabric

One fabric-like material that has been used successfully in prototypes of the invention and that possesses the requisite elasticity is understood to be referred to as DeMique (trademark of Kimberly-Clark Corporation, Neenah, Wis., for elastic nonwoven fabric) material or material that has been manufactured by a DeMique process. The secure fit of the diaper garment, without discomfort, is additionally aided in the preferred embodiments through the use of circumferential elastic material for the leg and tail openings.

In another aspect, the fabric used in the pet diaper garment may include a four-way stretch material. The four-way stretch material includes a tight-weave, four-way stretch fabric consists of about an eight (8) ounce tricot weave from about seventy-five (75) percent to about eighty-five (85) percent nylon fiber, and from about fifteen (15) percent to about twenty-five (25) percent segmented polyurethane fiber, such as spandex or elastane. This composition yields elasticity stretch factors of about ninety (90) to about one-hundred twenty (120) percent longitudinally, with a maximum stretch of about two-hundred twenty (220) percent, and about sixty (60) to about one-hundred (100) percent latitudinally, with a maximum stretch of about two-hundred (200) percent. In an alternative aspect of the invention, a polyester fiber may be substituted for the nylon fiber.

The elasticity of this fabric allows the garment to be easily put on and removed from the animal, and allows the animal substantial freedom of movement. Moreover, this fabric retains its shape after repeated washing and continued wear.

In an alternative aspect of the invention, the protective garment may include a weave such as Raschel with the percentages of the other materials remaining the same.

Connectors

In another important aspect of the invention, the garment closes with fasteners, for example, hook and loop fasteners like the fasteners sold under the trademark "Velcro", positioned as shown. As shown in FIG. 7, the shoulder straps 140 of the bib strap 110 may be adjustably joined with a connector 200. The connector 200 may be any connector known in the art for the purpose of joining or restraining straps, such as for example suspender straps and S-shaped straps.

Numerous modifications and variations in practice of the invention are expected to occur to those skilled in the art upon consideration of the foregoing detailed description of the invention. Consequently, such modifications and variations are intended to be included within the scope of the following claims.

Use of the Pet Diaper Garment

The pet diaper in the present invention may be provided in several different size categories, such as small, medium and large. Within those general size categories, the garment may be further customized to fit an animal within those size categories. The design of the pet diaper garment allows it to be easily and conveniently put on and taken off of the animal.

The pet diaper garment is placed onto the animal by encircling the absorbent garment 20 around the torso of the animal. The animal's legs are placed through leg openings 80 and a tail opening is made by pressing through perforations 70 in the back section 30. The animals tail may then be inserted through the opening made through perforations 70.

In an alternative aspect where the absorbent garment 20 opens along the back section, the absorbent garment 20 is secured around the animal's torso. The absorbent garment is also positioned around the tail and then secured along the top of the garment.

Once the absorbent garment 20 has been placed on the animal, bid straps 110 may be extended along the animal's chest, positioned around either side of the animal's head and neck, extended along the animal's back to connect with the absorbent garment 20. The absorbent garment 20 may be removed from the animal by removing the bib straps 110 from the absorbent garment 20 and removing the absorbent garment from the animal.

What is claimed is:

1. A pet diaper garment comprising:

an absorbent garment encircling an animal's torso, the absorbent garment having a back section, a front section, and stretchable side sections which join to form a top section, the back section including perforations effective for allowing a user to locate and create a tail opening; and a bib strap which is separable into two strap sections, the bib strap including a single strap section attached to the front section of the absorbent garment with reversible connectors, the single strap section including perforations that allow the bib strap to be separated into two strap sections, the bib strap extending around the front of the animal and connecting with a top section of the absorbent garment with a reversible connector.

2. The pet diaper garment of claim 1 wherein the absorbent garment includes a side section having a side opening.

3. The pet diaper garment of claim 1 wherein the absorbent garment includes leg openings securable with a snap closure.

4. The pet diaper garment of claim 1 wherein the reversible connector is Velcro.

5. A pet diaper garment comprising:

an absorbent garment encircling an animal's torso, the absorbent garment having a back section, a front section, and stretchable side sections which join to form a top section, the back section including perforations effective for allowing a user to locate and create a tail opening, the side sections including a side opening; and a bib strap which is separable into two strap sections, the bib strap including a single strap section attached to the front section of the absorbent garment, the single strap section including perforations that allow the bib strap to be separated into two strap sections, the bib strap extending around the front of the animal and connecting with a top section of the absorbent garment.

6. The pet diaper garment of claim 5 wherein the bib strap is attached to the absorbent garment with reversible connectors.

7. The pet diaper garment of claim 6 wherein the reversible connector is Velcro.

8. The pet diaper garment of claim 5 wherein the absorbent garment includes leg openings securable with a snap closure.

9. A pet diaper garment comprising:

an absorbent garment encircling an animal's torso, the absorbent garment having a back section, a front section, and stretchable side sections which join to form a top section, the back section including perforations effective for allowing a user to locate and create a tail opening, the absorbent garment including leg openings securable with a snap closure, and a bib strap which is separable into two strap sections, the bib strap including a single strap section attached to the front section of the absorbent garment, the single strap section including perforations that allow the bib strap to be separated into two strap sections, the bib strap extending around the front of the animal and connecting with a top section of the absorbent garment.

10. The pet diaper garment of claim 9 wherein the bib strap is attached to the absorbent garment with reversible connectors.

11. The pet diaper garment of claim 10 wherein the reversible connector is Velcro.

12. The pet diaper garment of claim 10 wherein the absorbent garment includes a side section having a side opening.

* * * * *